July 14, 1931. Y. H. KURKJIAN 1,814,712
MACHINE FOR THE TREATMENT OF RUBBER FORMING DEVICES
Filed Feb. 21, 1929 7 Sheets-Sheet 2
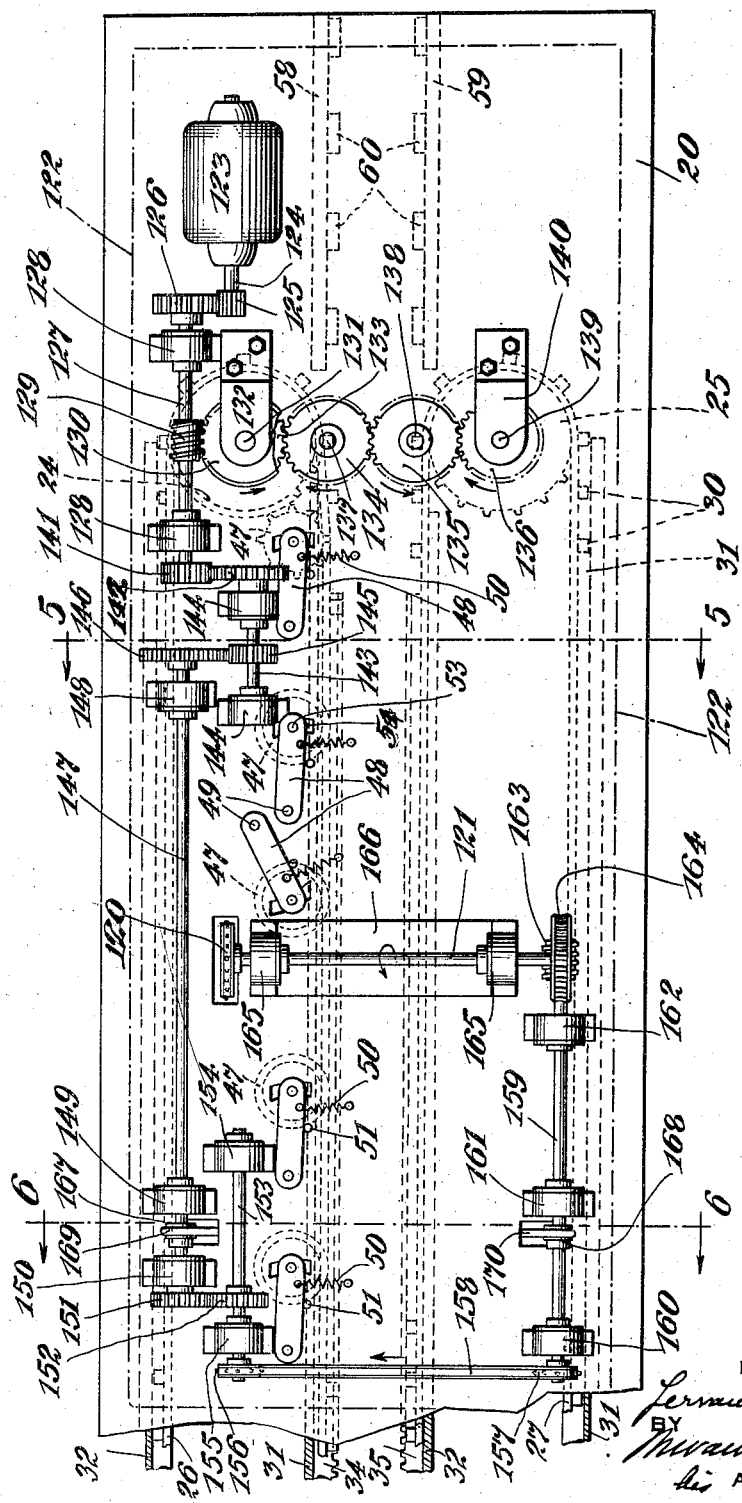
INVENTOR
ATTORNEY July 14, 1931.  Y. H. KURKJIAN  1,814,712
MACHINE FOR THE TREATMENT OF RUBBER FORMING DEVICES
Filed Feb. 21, 1929  7 Sheets-Sheet 3

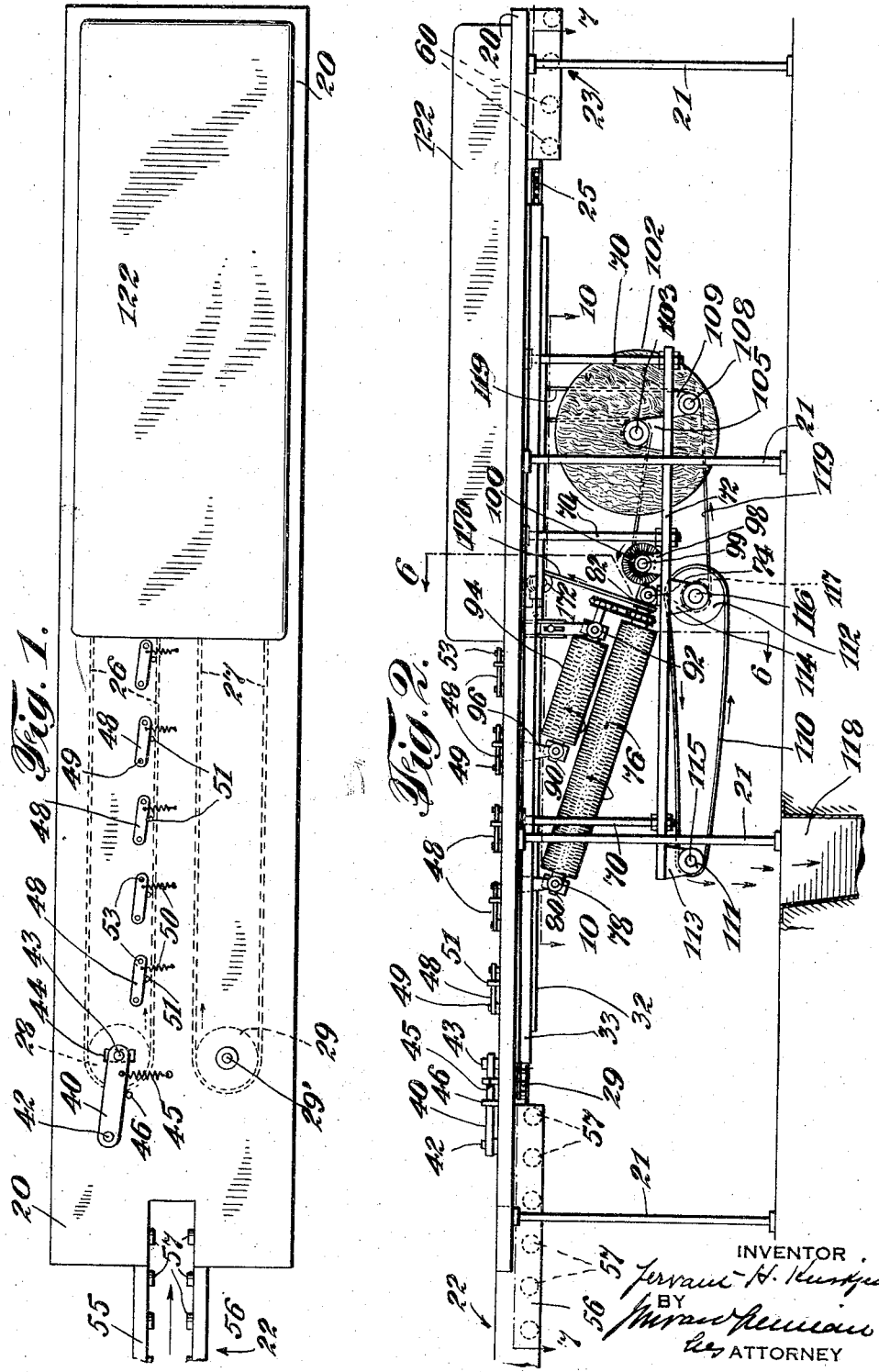

INVENTOR
Yerrant H. Kurkjian
BY
ATTORNEY

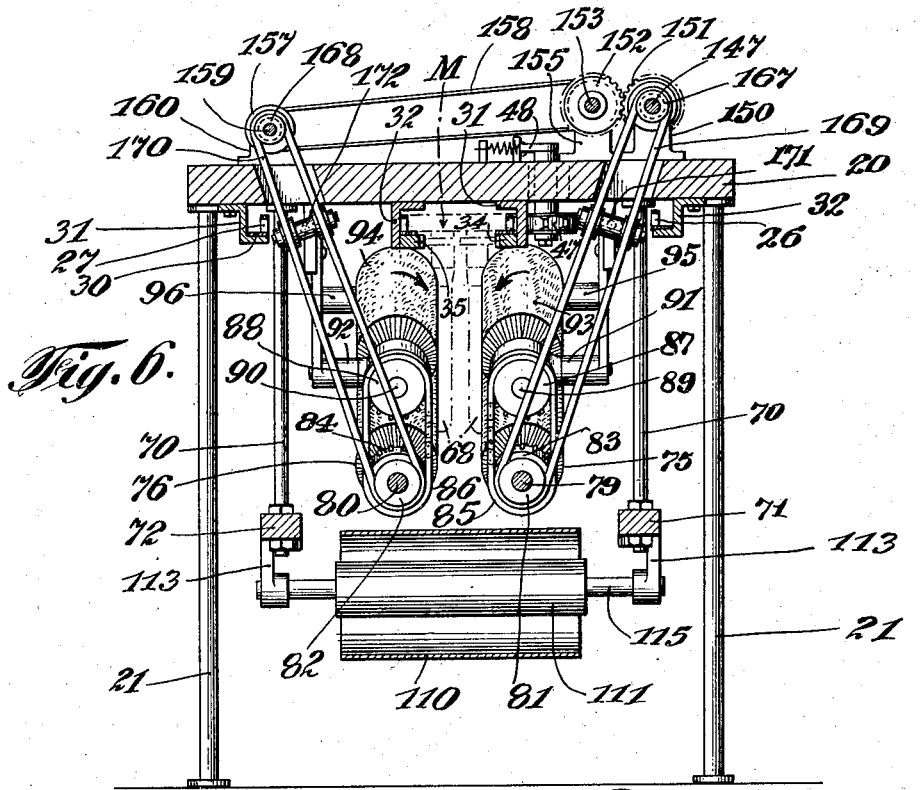
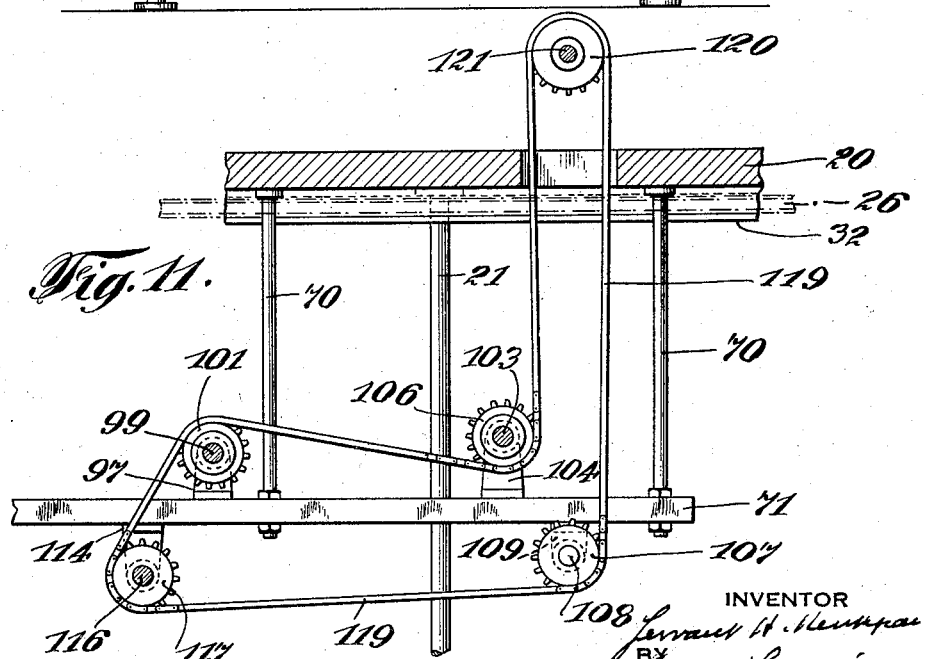

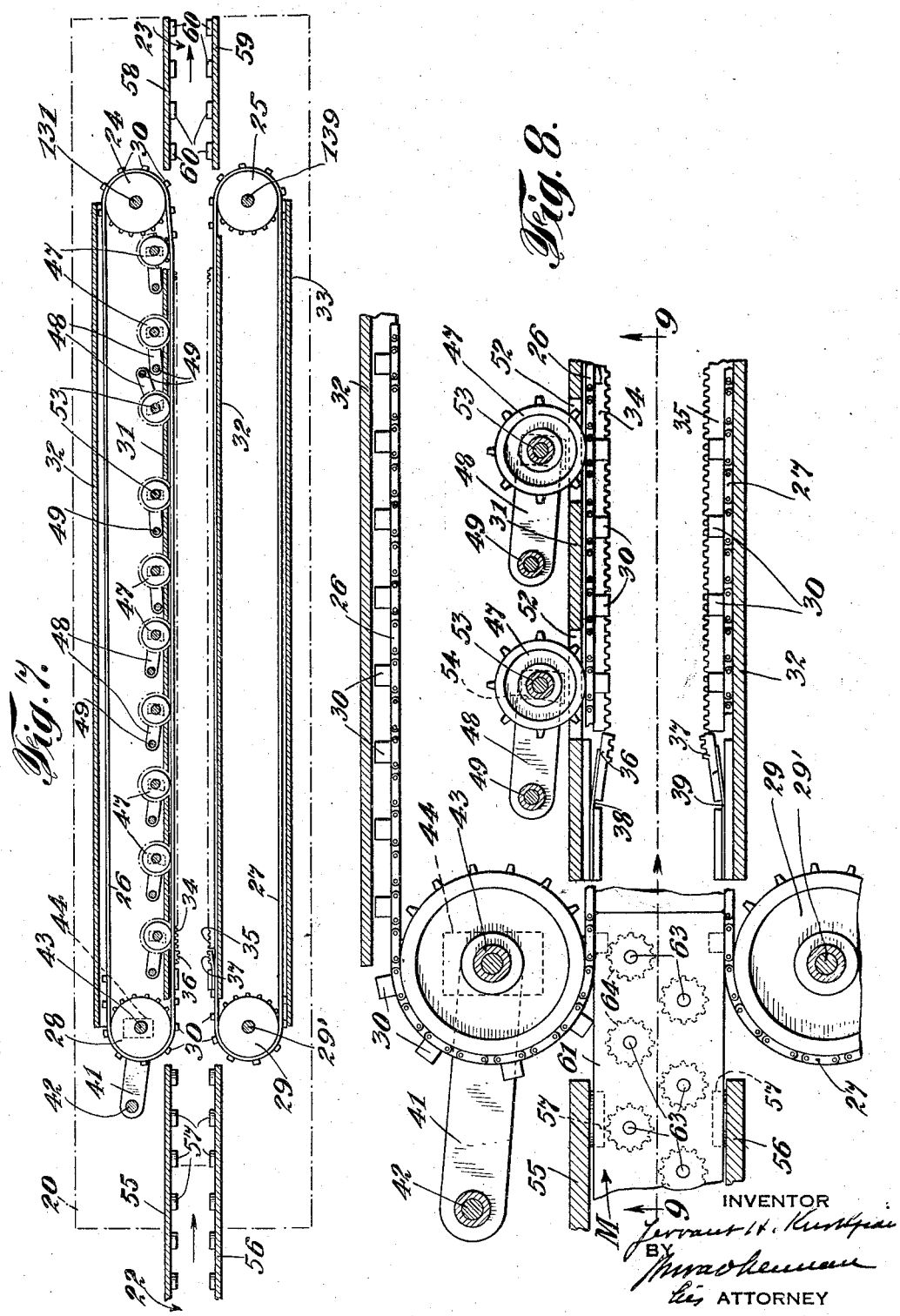

July 14, 1931.  Y. H. KURKJIAN  1,814,712
MACHINE FOR THE TREATMENT OF RUBBER FORMING DEVICES
Filed Feb. 21, 1929  7 Sheets-Sheet 6
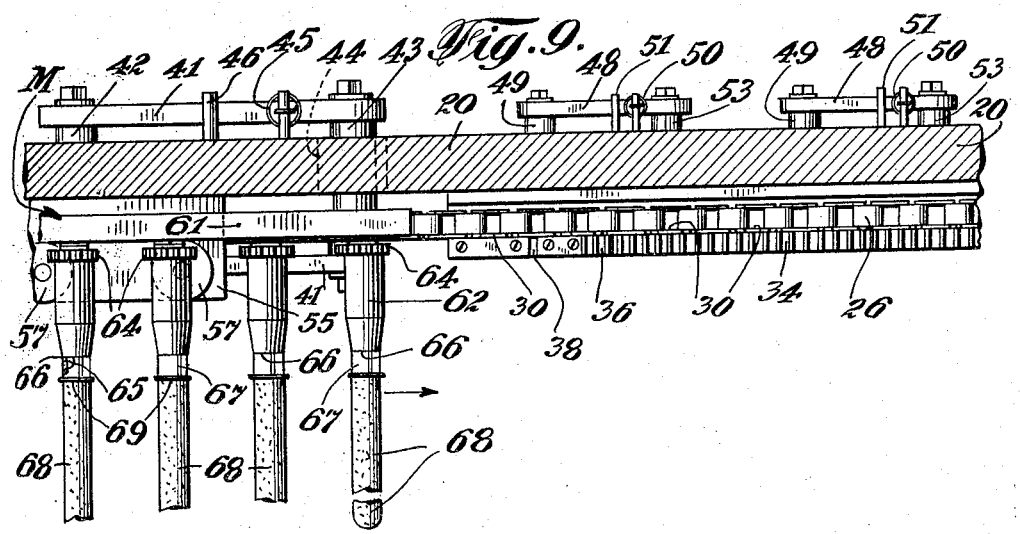
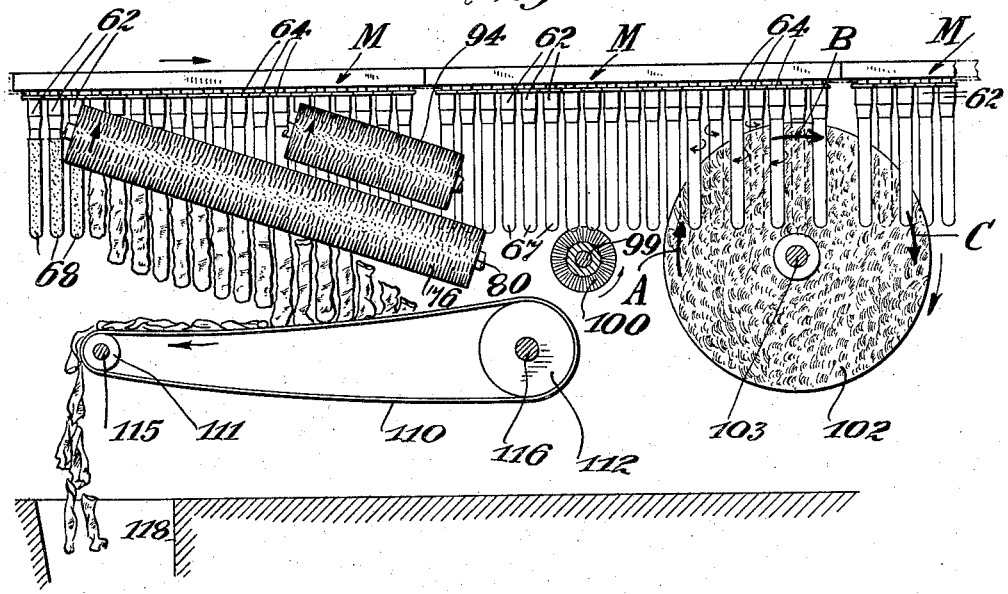
INVENTOR.
ATTORNEY

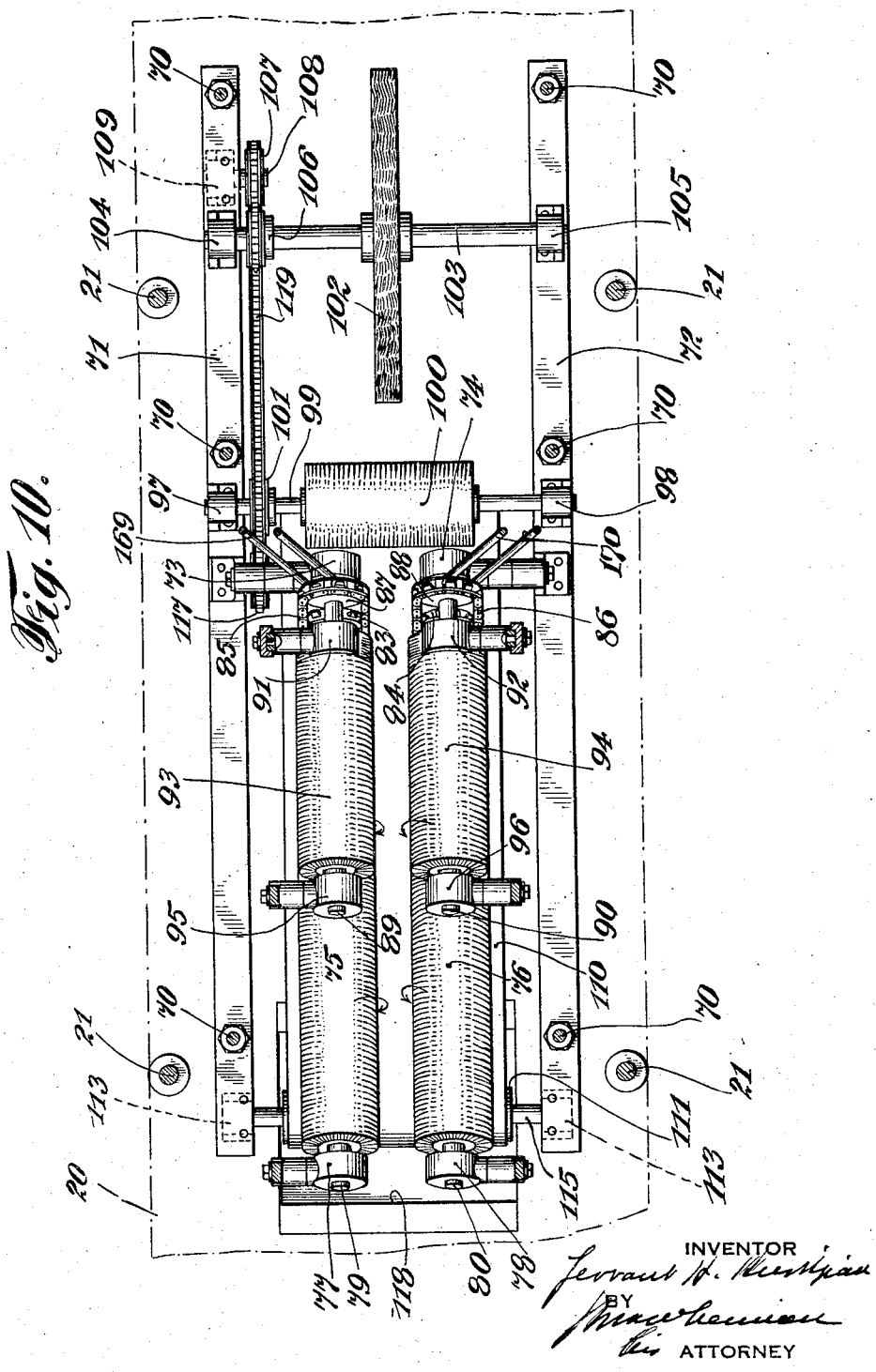

Patented July 14, 1931

1,814,712

UNITED STATES PATENT OFFICE

YERVANT H. KURKJIAN, OF HAWTHORNE, NEW JERSEY, ASSIGNOR TO CARL J. SCHMID, INC., OF NEW YORK, N. Y., A CORPORATION OF NEW JERSEY

MACHINE FOR THE TREATMENT OF RUBBER FORMING DEVICES

Application filed February 21, 1929. Serial No. 341,788.

My invention relates to devices adapted for the treatment of rubber articles and refers particularly to devices adapted for removing rubber articles from the mold upon which they have been formed and in cleaning and polishing said molds for their following employment.

The usual process for producing certain forms of rubber goods, such as finger cops, balloons &c., is to immerse glass molds of the proper size and shape into a solution of rubber, depositing a film of rubber upon said molds, removing the molds with their adhering films from the rubber bath, producing a bead upon the open end of the film, vulcanizing the rubber articles thus formed, and removing the vulcanized rubber articles from the mold.

My invention is a device whereby the vulcanized rubber articles are removed from their molds, the molds are freed from any adhering rubber and finally polished in order that they may be in proper condition for re-use in the production of the articles.

As my device allows of the continuous performance of all of the above operations, thus presenting automatic means for the several mentioned steps of operation, it is evident that it possesses high economical and efficient values for the objects for which is designed.

In the accompanying drawings representing one form of my device similar parts are designated by similar numerals.

Figure 1 represents a top view of one form of my device.

Figure 2 is a side view of the device of Figure 1.

Figure 3 is a top view of the drive mechanism.

Figure 6 is a cross-section taken on the line 6—6 of Figures 2 and 3, respectively.

Figure 7 is a longitudinal sectional plan view taken on the line 7—7 of Figure 2.

Figure 8 represents a fragmentary view similar to Figure 7 on a larger scale, showing the details more clearly.

Figure 9 is a longitudinal section taken on the line 9—9 of Figure 8.

Figure 10 is a longitudinal section of the lower mechanism, taken on the line 10—10 of Figure 2.

Figure 11 is a sectional view taken on the line 11—11 of Figure 4.

Figure 12 is a side view of the removing and cleaning mechanism.

Figure 4:
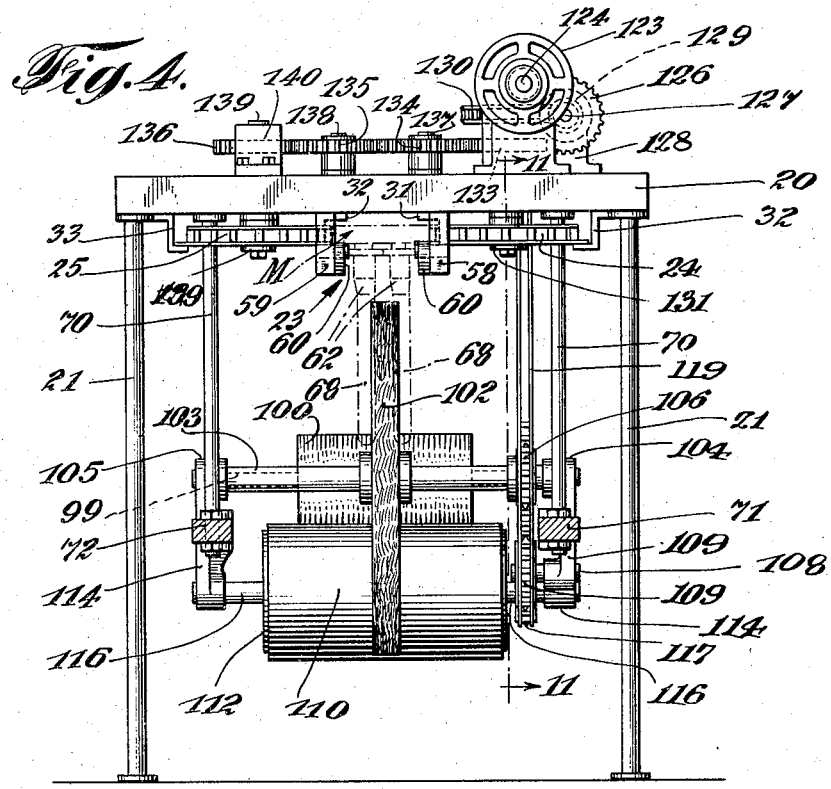
Figure 4 is a right end elevation of the device.
Figure 5:
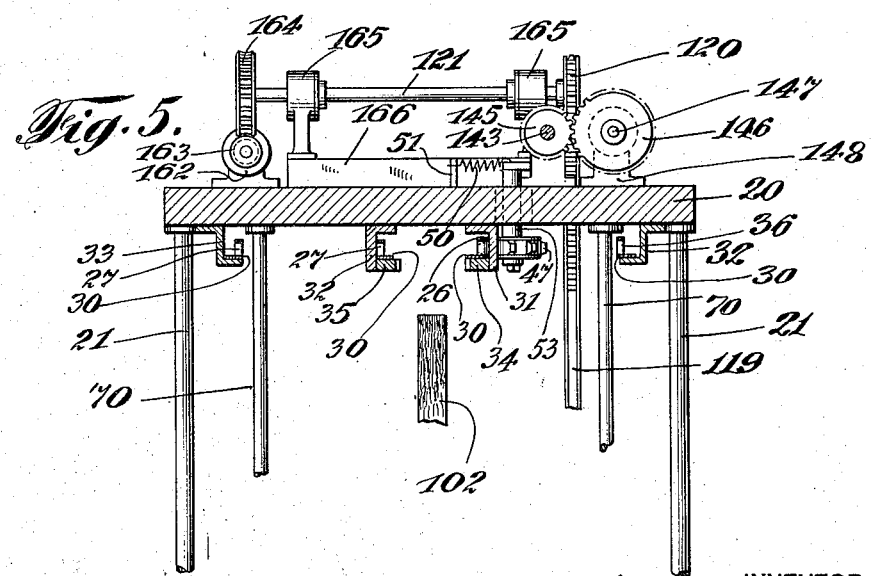
Figure 5 is a cross-section taken on the line 5—5 of Figure 3.

The particular form of my device shown in the accompanying drawings comprises a table 20, supported by the legs 21, 21. Mold carriers M enter the machine at one end 22 and leave same at the other end 23.

Underneath the table 20 are driven sprockets 24 and 25, carrying link chains 26, 27 over idler sprockets 28, 29, the latter being mounted upon stub shaft 29'. The link chains carry special links 30, for a purpose explained later. A pair of angle bars 31, 32 are attached underneath the table 20 which serve as a support for the link chains 26, 27 at their inner side, and another pair of Z bars 32, 33 attached underneath the table to support the link chains 26, 27 at their outside.

Each angle bar 31, 32 carries a fixed rack 34, 35 and flexible entering racks 36, 37 secured to leaf springs 38, 39 mounted upon the inner side of the angle bars 31, 32. The idler sprocket 28 is held between a pair of links 40, 41, pivotally secured to the table at 42, the other end of the links carrying the sprocket shaft and bearing 43, which passes through a slot 44 in the table 20. A spring 45 tends to pull the links and sprocket toward the center of the machine against a stop pin 46.

A series of idler sprockets 47 having links 48, pivot shafts 49, springs 50 and stop pins 51, pass through openings 52 in angle bar 31. The sprocket bearings 53 pass through similar slots 54 in the table 20.

Thus, idler sprockets 28 and 47 tend to push the link chain 26 within its angle bar 31 toward the center of the machine.

At the entering side of the machine are a pair of guide extensions 55, 56 secured to the table 20, carrying rollers 57 and at the other end of the machine are similar guide bars 58, 59 secured to the underside of the table 20, carrying rollers 60.

The mold carrier M, Figures 8, 9 and 12, consists of a board 61 carrying two rows of wooden shanks 62 revolubly mounted around fixed spindles 63 as clearly seen in Figure 8 and are secured to the board 61.

Each shank carries a pinion 64 attached thereto.

Each wooden shank 62 is reduced at its outer end 65, forming a shoulder 66 upon which is connected a glass mold 67 carrying the vulcanized rubber goods 68 with its reinforcing bead 69 thereon.

Secured underneath the table 20 by posts 70 are frame members 71 and 72, supporting adjustable bracket bearings 73, 74, at one end of a pair of inclined brushes 75, 76, the other ends of the brushes are held in adjustable bracket bearings 77, 78, secured underneath the table 20. Mounted upon the shafts 79 and 80 of the cylindrical brushes 75, 76 are pulleys 81, 82, sprockets 83, 84, link chains 85, 86, connecting another pair of sprockets 87, 88, fixedly attached to brush shafts 89, 90. Shafts 89 and 90 are carried by adjustable brackets 91, 92, at the lower end of the inclined cylindrical brushes 93, 94, which are shorter than the brushes 75, 76 and having somewhat stiffer bristles.

The upper ends of the shafts 89, 90, are carried by adjustable bearings 95, 96, which in turn are secured underneath the table 20.

Mounted upon frame members 71, 72 are bracket bearings 97, 98, whose shaft 99 carries a revoluble brush 100, driven by a sprocket 101 keyed to the shaft 99. A rotary disc 102 covered with sheepskin is keyed to a shaft 103 mounted in bearings 104, 105, secured to frame members 71, 72 and driven by sprocket 106.

Another sprocket 107 is carried by a stub shaft 108 held in bearing bracket 109 mounted upon frame 71.

A delivery conveyor belt 110 passes over idler rollers 111, 112, held in bracket bearings 113, 114 by shafts 115, 116. Shaft 116 is driven by sprocket 117. The rubber goods are delivered into a chute 118 through the floor. The sprockets 101, 106, 107 and 117 are driven by a link chain 119, as clearly shown in Figure 11, passing over a driven sprocket 120 keyed to shaft 121.

The driving means of the machine, which is mounted upon the top of the table 20 and housed with a protective cover 122, consists of a motor 123, whose shaft 124 carries a pinion 125 meshing with a larger gear 126, keyed to shaft 127 and held in ball bearings 128. Fixedly attached to the shaft 127 is a worm 129, meshing with a worm wheel 130, mounted to shaft 131 and secured in bracket 132. Shaft 131 also carries the fixed sprocket 24 of the link chain 26.

Gear 133 mounted to shaft 131 meshes with a string of gears 134, 135, 136, keyed to shafts 137, 138, 139, respectively, held in suitable bearings. Shaft 139 also carries the other sprocket 25 with its link chain 27 and is held in bearing bracket 140.

Worm shaft 127 carries at its outer end a gear 141 meshing with another gear 142 fixed to shaft 143 and held in ball bearings 144 secured to the table 20. Gear 145 upon shaft 143 meshes with gear 146 keyed to shaft 147 and journaled in ball bearings 148, 149 and 150. At the end of shaft 147 is a gear 151 meshing with gear 152 keyed to shaft 153, held in ball bearings 154, 155. The end of shaft 153 has a sprocket 156 which connects a similar sprocket 157 by link chain 158 mounted upon shaft 159 and journaled in ball bearings 160, 161 and 162.

A worm 163 is keyed to the shaft 159 and engages a worm wheel 164 carried by sprocket shaft 121 mentioned before. Shaft 121 is journaled in ball bearings 165, 165, mounted upon a block 166 secured to the table 20.

Parallel shafts 147 and 159 carry pulleys 167 and 168, respectively, which have belt connections 169, 170 with brush pulleys 81, 82. Belt tightening rollers 171, 172 are interposed between the belts 169, 170 and held in suitable adjustable brackets mounted underneath the table 20.

The operation of my device is as follows:—

After the vulcanized rubber goods upon the glass molds of the mold carrier M have been dipped in a bath of gasoline and talcum solution which softens the rubber, the mold carrier is placed with its downwardly directed molds between the guide extensions 55, 56 at the feed end of the machine 22, resting on top the rollers 57 and pushed into engagement with the special links 30 of link chains 26, 27.

The board 61 rests on top of the special links 30 and the link chain 26 applies pressure to the longer edge of the board, feeding the mold carrier into engagement with the the flexible racks 36, 37, which tend to rectify engagement with the mold pinions 64 into perfect mesh with the stationary racks 34, 35. The forward movement of the mold carriers by the link chains 26, 27 and the engagement of the mold pinions 64 with the racks 34, 35 cause the molds to rotate in opposite directions as clearly shown in Figures 8 and 12.

As soon as the molds get into the path of the relative fast rotating brushes 75, 76 which turn in opposite directions, Figures 2, 6 and 12, the bead 69 of the rubber goods 68 is loosened by the bristles of the inclined brushes 75, 76 and stripped down upon its glass mold 67 until they fall off upon the slow moving conveyor belt 110. The brushes 75, 76 also serve to clean the rotating empty glass molds 67. Brushes 93 and 94, rotating at the same speed and direction as brushes 75, 76 serve to strip off any rubber still sticking to its glass mold. The bristles of rollers 93, 94, are somewhat stiffer than the former ones, and, therefore giving greater stripping pressure upon the beads 69 of the rubber goods.

In addition, these rollers give a second cleaning of the glass molds 67 around the bead zone. As the empty glass molds 67 advance further its tips pass over the slow rotating brush 100, which cleans the ends of the molds.

The molds then approach the sheepskin covered rotary disc 102, which is slow moving between the two rows of molds 67. At this station the glass molds receive their final polishing in multiple directions, as indicated in Figure 12, by arrows A upwards, B longitudinal, C downward.

Finally the cleaned glass molds mounted on their mold carrier leave link chains 26, 27 and enter into the guide bars 58, 59 over rollers 60 to be taken off at the end 23 of the machine.

Since the mold carriers M are merely engaged frictionally by the spring pressed link chain 26 in their forward movement, all danger of jamming or breakage of any part in the transport will be eliminated.

It is evident that as the molds revolve, the brush 100 and the disc 102 may be stationary, but I prefer to have them revolve.

Although one specific embodiment of the invention has been particularly shown and described, it will be understood that the invention is capable of modifications and changes in the construction and in the arrangement of the various operating parts may be made without departing from the spirit or scope of the invention, as expressed in the following claims.

What I claim is:—

1. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush positioned above said first mentioned brush and abutting upon said molds and means for revolving said upper brush.

2. In a device of the character described, in combiantion, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush positioned above said first mentioned brush of less length than said first mentioned brush and abutting upon said molds and means for revolving said upper brush.

3. In a device of the character described, in combination, a plurality of revoluble longitudinally movable molds, means for imparting a revoluble movement to said molds, means for imparting a longitudinal movement to said molds, an inclined revoluble brush abutting upon said molds, the revolution of which will remove rubber forms carried by said molds, means for revolving said brush, cleaning means abutting upon said molds after said molds have passed from contact with said brush.

4. In a device of the character described, in combination, a plurality of revoluble longitudinally movable molds, means for imparting a revoluble movement to said molds, means for imparting a longitudinal movement to said molds, an inclined revoluble brush abutting upon said molds, the revolution of which will remove rubber forms carried by said molds, means for revolving said brush, revoluble cleaning means abutting upon said molds after said molds have passed from contact with said revoluble brush and means for revolving said cleaning means.

5. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, revoluble cleaning means abutting upon said molds after said molds have passed from contact with said revoluble brush and means for revolving said cleaning means.

6. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush positioned above said first mentioned brush and abutting upon said molds, means for revolving said upper brush, cleaning means abutting upon said molds after said molds have passed from contact with said brushes.

7. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush positioned above said first mentioned brush and abutting upon said molds, means for revolving said upper brush, revoluble cleaning means abutting upon said molds after said molds have passed from contact with said revoluble brushes and means for revolving said cleaning means.

8. In a device of the character described, in combination, a plurality of revoluble longitudinally movable molds, means for imparting a revoluble movement to said molds, means for imparting a longitudinal movement to said molds, an inclined revoluble brush abutting upon said molds, the revolution of which will remove rubber forms carried by said molds, means for revolving said brush, a revoluble brush abutting upon the lower end of said molds after said molds have passed from contact with said brush and means for revolving said brush.

9. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, a revoluble brush abutting upon the lower end of said molds after said molds have passed from contact with said brush and means for revolving said brush.

10. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush poistioned above said first mentioned brush and abutting upon said molds means for revolving said upper brush, a revoluble brush abutting upon the lower end of said molds after said molds have passed from contact with said brush and means for revolving said brush.

11. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, a revoluble disc abutting upon the side of said molds after said molds have passed from contact with said brushes and means for revolving said disc.

12. In a device of the character described, in combination, a plurality of revoluble longitudinally movable molds, means for imparting a revoluble movement to said molds, means for imparting a longitudinal movement to said molds, an inclined revoluble brush extending beyond the extremities of said mold and abutting upon said molds, the revolution of which will remove rubber forms carried by said molds, means for revolving said brush, an inclined revoluble brush positioned above said first mentioned brush and abutting upon said molds, means for revolving said upper brush, a revoluble brush abutting upon the lower end of said molds after said molds have passed from contact with said brush, means for revolving said brush, a revoluble disc abutting upon the side of said molds after said molds have passed from contact with said brushes and means for revolving said disc.

Signed at New York city, in the county of New York and State of New York, this 19th day of February, 1929.

YERVANT H. KURKJIAN.